(12) United States Patent
Tani et al.

(10) Patent No.: US 8,625,118 B2
(45) Date of Patent: Jan. 7, 2014

(54) DISPLAY OPERATION DEVICE HAVING FUNCTIONS DISTINGUISHED BY COLORS OF OPERATION BUTTONS, AND IMAGE PROCESSING APPARATUS ADOPTING THE DISPLAY OPERATION DEVICE

(75) Inventors: Takeshi Tani, Osaka (JP); Tetsuo Fukumoto, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 96 days.

(21) Appl. No.: 13/178,875

(22) Filed: Jul. 8, 2011

(65) Prior Publication Data

US 2012/0008158 A1    Jan. 12, 2012

(30) Foreign Application Priority Data

Jul. 9, 2010    (JP) .................................. 2010-156651

(51) Int. Cl.
*G06F 3/12*  (2006.01)

(52) U.S. Cl.
USPC ........... 358/1.13; 358/1.8; 358/1.14; 358/1.9; 358/1.15; 358/442; 345/156

(58) Field of Classification Search
USPC .......................... 358/1.14, 1.15, 1.13, 1.8, 1.9
See application file for complete search history.

(56) References Cited

U.S. PATENT DOCUMENTS

| 4,597,662 A | 7/1986 | Hirata et al. |
| 2008/0065622 A1 | 3/2008 | Goto et al. |
| 2009/0110365 A1 | 4/2009 | Osaki et al. |
| 2009/0290849 A1 | 11/2009 | Ohtake et al. |
| 2009/0303557 A1* | 12/2009 | Nishimura .................... 358/527 |
| 2010/0027059 A1* | 2/2010 | Ebi .............................. 358/1.15 |
| 2011/0004524 A1* | 1/2011 | Paul et al. ................... 705/14.58 |
| 2011/0316811 A1 | 12/2011 | Kitagawa |

FOREIGN PATENT DOCUMENTS

| JP | 59-58457 | | 4/1984 |
| JP | 59-140463 | A | 8/1984 |
| JP | 10-105001 | A | 4/1998 |
| JP | 10-312261 | A | 11/1998 |
| JP | 2005-64944 | A | 3/2005 |
| JP | 2006-146729 | A | 6/2006 |
| JP | 2009-111628 | A | 5/2009 |
| JP | 2009-278548 | A | 11/2009 |
| JP | 2010-026592 | A | 2/2010 |
| WO | WO2010/107009 | A1 | 9/2010 |

* cited by examiner

*Primary Examiner* — Houshang Safaipour
*Assistant Examiner* — Richa Mishra
(74) *Attorney, Agent, or Firm* — Edwards Wildman Palmer LLP; David G. Conlin; Edmund J. Koundakjian

(57) ABSTRACT

A display operation device includes: a display-integrated operation panel; a first UI component display device displaying a read start key; a read activating device responsive to a user operation of the read start key, for starting a document reading process; a second UI component display device, responsive to activation of the document reading process, for displaying a read stop key in place of the read start key; and a reading process stopping device, responsive to a user operation of the read stop key, for stopping execution of the reading process. When reading ends, an additional read key is displayed in place of the read stop key. The background color of read stop key is selected to be much different from the background color of read start key, and the background color of additional read key is selected to be analogous to the background color of read start key.

13 Claims, 11 Drawing Sheets

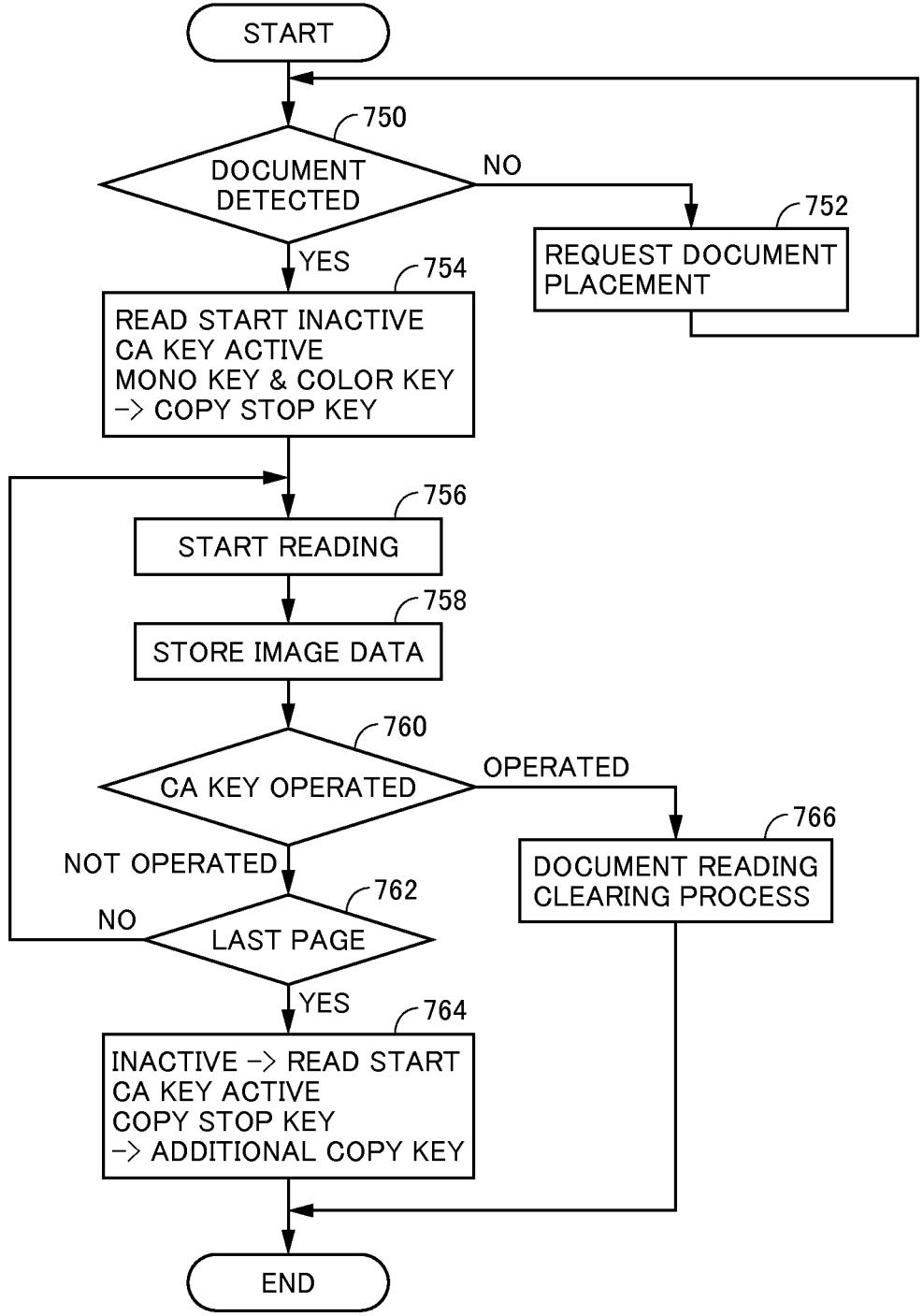

DISPLAY OPERATION DEVICE HAVING FUNCTIONS DISTINGUISHED BY COLORS OF OPERATION BUTTONS, AND IMAGE PROCESSING APPARATUS ADOPTING THE DISPLAY OPERATION DEVICE

CROSS-REFERENCE TO RELATED APPLICATION

This nonprovisional application claims priority under 35 U.S.C. §119(a) on Patent Application No. 2010-156651 filed in Japan on Jul. 9, 2010, the entire contents of which are hereby incorporated by reference.

BACKGROUND OF THE INVENTION

1. Field of the Invention

The present invention relates to a display operation device for giving an instruction to electronic equipment and, more specifically, to a display device receiving a user instruction using a user interface (UI) component such as a software button as a trigger of some process, as well as to an image processing apparatus having such a display operation device.

2. Description of the Background Art

As one type of image processing apparatuses as electronic equipment, image forming apparatuses (typically, copy machines) are introduced to many places of business (companies and offices). A main function of an image forming apparatus is to form an image on a sheet of recording paper. Therefore, it is often the case that the image forming apparatus has a printer function, a copy function and the like. The image forming apparatuses are often connected to a network, to allow use by a plurality of users. A multifunction peripheral (MFP) has been known as one type of such image forming apparatuses. An MFP has a scanner function, and has a plurality of basic operational modes such as a copy mode, a facsimile mode (hereinafter "facsimile" may also be denoted as FAX or fax), and a network-supported printer mode. It is expected that the scanner function will be used more frequently in the future in such image forming apparatuses. In the copy mode and facsimile mode also, it is possible to read an image using the scanner function and to set functions such as duplex (two-sided) printing, collective printing (such as 2-in-1 by which two pages of an original document are printed on one sheet, or 4-in-1 by which four pages of an original document are printed on one sheet), and enlargement or reduction of size.

When using such an image forming apparatus, by way of example, the user makes the following operations. First, the user has image data read by the image forming apparatus in the scanner mode. Thereafter, the user inputs various instructions through an operation panel, and performs image processing (such as collection). Then, the user gives an instruction to start a final processing of the image (printing to a sheet of paper, transmission by facsimile, and saving as a file). A screen image allowing setting of functions in various operational modes, for example, is displayed on the operation panel. Therefore, it is possible for the user to easily set various functions.

Recently, a touch-panel display comes to be increasingly used as such an operation panel. A touch-panel display includes a liquid crystal panel (display panel) and a touch-panel stacked on the liquid crystal panel. Typically, items (software buttons) allowing selection of an operational mode of the image forming apparatus are displayed on the touch-panel display. Viewing the display, the user presses a position where a desired item is displayed, on the touch-panel display. For the user, it seems as if he/she has pressed a software button. Information related to which position has been pressed is transmitted to a computer controlling the image forming apparatus, and what operation is to be carried out is determined in accordance with the position, by a program running on the computer.

The touch-panel display provides both the display function and the operation function. It is advantageous in that it occupies a smaller area for installation than a display unit and an operation unit provided separately, it allows various and many manners of display, and it provides various and many functions.

By way of example, when an MFP having a touch-panel display as such as an operation panel is in the copy mode, a copy start key (button) is displayed on the display as an initial screen image. If the copy start key is pressed, using this as a trigger, the MFP automatically reads a document placed on an automatic document reader and forms a copy on a sheet of recording paper.

After the start of copying, the user may want to stop copying by some reason. For this purpose, it is a general practice to display a copy stop key together with the copy start key, allowing the user to stop copying by pressing the copy stop key once the copying operation is started. However, this hinders efficient use of the area of touch-panel display. Considering the fact that MFPs come to have various and many functions, many pieces of information must be displayed on the display, and such pieces of information must be displayed in an easily viewable and easily understandable manner. Therefore, the area of touch-panel display should not be wasted.

In order to solve such a problem, Japanese Utility Model Laid-Open Application No. 59-58457 (hereinafter referred to as '457 Reference) discloses a technique of using one switch both as a copy start switch and a copy stop switch. Specifically, '457 Reference discloses a technique in which during a copy operation, the copy start key is used as a copy stop key. In the device disclosed in this reference, either one of two indications "START" and "STOP" lights up on a hardware key. The indication corresponding to the usable function lights up on the key.

Other main functions of the MFP include a document reading function, used in copying and facsimile transmission. Similar problem as described above occurs when the MFP reads documents. Further, it is often the case that, at the time of document reading, after a document is read by the MFP, the user wishes to have an additional document read. It is not efficient to provide a key dedicated for additional document reading. Japanese Patent Laying-Open No. 2005-64944 (hereinafter referred to as '944 Reference) discloses a technique in which the initially displayed read start button is displayed as an additional read start button. Specifically, the characters displayed on the button are changed from "read start" to "additional read start."

The technique described in '457 Reference and the technique described in '944 Reference are based on similar ideas of allocating different functions to one key or button (hereinafter referred to as "button or the like") and switching the functions to be used. These are good techniques that allow advantageous use of the display area.

These techniques, however, still have room for improvement. Specifically, in both techniques, it is difficult to understand the function allocated to the button or the like, until the user reads the characters displayed on the button or the like. Particularly, in '457 Reference, one key has opposite functions of "start" and "stop," while in '944 Reference, one key has similar functions of "read start" and "additional read start". Therefore, when different functions are allocated to one button, it is difficult to recognize whether the functions are similar to or very much different from each other. Such a problem arises not only on software buttons but also on general UI components (for example, pull-down menu, combo boxes, tabs, table cells or icons, texts or images used in place of software buttons) used as a trigger of a task on a display-operation panel.

SUMMARY OF THE INVENTION

Therefore, it is preferable to provide a display operation device that allows intuitive recognition as to whether functions allocated to a UI component displayed on the display-operation penal are similar functions or different functions, as well as to provide an image forming apparatus provided with such a display operation device.

According to a first aspect, the present invention provides a display operation device, including: a display-integrated operation panel having a display screen; a first UI component display device displaying a first user interface (UI) component image on the display screen; a process activating device, responsive to a user operation of the first UI component displayed on the display screen by the first UI component display device, for activating a process associated with the first UI component; a second UI component display device, responsive to activation of the process associated with the first UI component by the process activating device, for displaying a second UI component in place of the first UI component on the display screen; and a process stopping device, responsive to a user operation of the second UI component displayed on the display screen by the second UI component display device, for stopping execution of the process. Part of the second UI component is displayed in a color complementary to a display color of a part of the first UI component, or a color analogous to the complementary color, or a color same as but having different tone from the complementary color.

When the user operates the first UI component, the process associated with the component is activated. At the same time, the second UI component display device displays the second UI component in place of the first UI component. If the second UI component is operated, execution of the activated process is stopped. Display color of a part of the second UI component is a complementary color, or a color analogous to the complementary color, or the same complementary color of different tone, of the display color of a part of the first UI component. Since the display colors are very different, the user can easily and intuitively understand that the process started by operating the first UI component is stopped by operating the second UI component. As a result, a display that allows intuitive understanding as to whether the functions of UI component displayed on the display-operation panel are similar functions or different functions can be provided.

Preferably, the display operation device further includes: a third UI component display device, responsive to end of the process, for displaying a third UI component in place of the second UI component; and a process resuming device, responsive to a user operation of the third UI component displayed on the display screen by the third UI component display device, for resuming the process. Part of the third UI component is displayed in a color analogous to or the same as but having different tone from display color of the part of the first UI component.

When the process activated by operating the first UI component ends, the third UI component is displayed. If the third UI component is operated, the process executed by operating the first UI component is resumed by the process resuming device, and the similar process can be executed in an additional manner. Since the display color of a part of the third UI component and the display color of a part of the first UI component are analogous or the same color of different tone, the user can easily and intuitively understand that the functions are similar.

The part of the second UI component may be a background portion of the second UI component, or a character portion formed in the second UI component.

Preferably, the display operation device further includes a fourth UI component display device for displaying a fourth UI component at a position different from the first UI component on the display screen; and a device, responsive to a user operation of the fourth UI component displayed on the display screen by the fourth UI component display device, for controlling the first UI component such that the first UI component is displayed in place of the second and third UI components.

By operating the fourth UI component, the initial state in which the first UI component is displayed is resumed. Since the first UI component is displayed, the user can easily understand the initial state is resumed and a new process can be started.

Preferably, the display operation device is used connected to an image forming apparatus for forming a document image read by the document reading device on a sheet of recording paper. The display operation device further includes a device, responsive to a user operation of the fourth UI component displayed on the display screen by the fourth UI component display device, for controlling the image forming apparatus such that a process for forming an image of the document read by the document reading device on a sheet of recording paper is started.

The second UI component may be displayed at the same position, in the same size and in the same shape as the first UI component. Then, the part of the first UI component and the part of the second UI component may be portions that match if the first and second UI components were superposed. The part of the first UI component may be a background portion of the first UI component, or it may be a character portion formed in the first UI component.

According to a second aspect, the present invention provides an image forming apparatus, including: any of the display operation devices described above; a document reading device, connected to the display operation device, for reading a document and converting it to image data, in accordance with an instruction from the display operation device; and an image forming unit, connected to the display operation device and to the document reading device, for storing image data output from the document reading device and, in response to an output instruction from the display operation device, for forming an image of the image data on a sheet of recording paper.

According to a third aspect, the present invention provides a computer program causing, when executed by a computer connected to a display-integrated operation panel having a display screen, the computer to operate as: a first UI component display device for displaying an image of a first user interface (UI) component on the display screen; a process activating device, responsive to a user operation of the first UI component displayed on the display screen by the first UI component display device, for activating a process associated with the first UI component; a second UI component display device, responsive to activation of the process associated with the first UI component by the process activating device, for displaying a second UI component in place of the first UI component on the display screen; and a process stopping device, responsive to a user operation of the second UI component displayed on the display screen by the second UI component display device, for stopping execution of the process. Part of the second UI component is displayed in a color complementary to a display color of a part of the first UI component, or a color analogous to the complementary color, or a color same as but having different tone from the complementary color.

As described above, according to the present invention, when the first UI component displayed on the display-operation panel is operated, a certain process is activated, and the second UI component is displayed in place of the first UI component. If the newly displayed second UI component is operated, the activated process is stopped. When the certain process ends, the third UI component is displayed, and if the third UI component is operated, the process started by the operation of the first UI component can be resumed. Display colors of a part of the first UI component and a part of the second UI components are complementary colors, or analogous to the complementary colors, or the complementary colors of different tones, to each other. Therefore, it can easily and intuitively be understood that functions allocated to the components are very different. On the other hand, the first and third UI components have analogous colors or the same color of different tones. Therefore, it can easily be understood that functions allocated to these components are of the same type. As a result, a display operation device that allows intuitive understanding as to whether the functions of the UI component displayed on the display operation panel are similar functions or different functions can be provided and, further, an image forming apparatus having such a display operation device can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a flowchart of a copy process program, realizing display transitions of the task trigger area such as shown in FIG. 10, in the image forming apparatus shown in FIG. 1.

DESCRIPTION OF THE PREFERRED EMBODIMENTS

Figure 1:
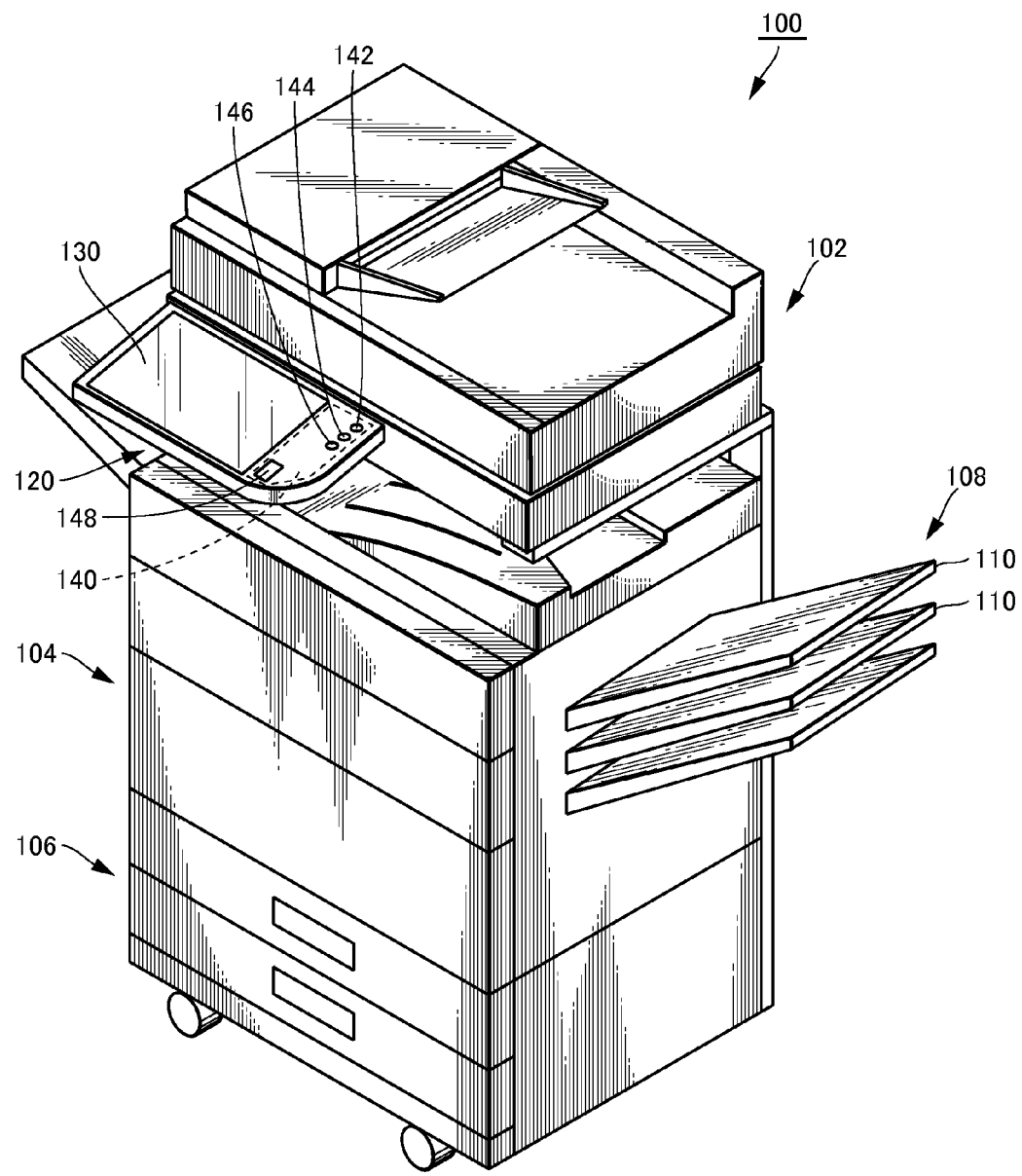
FIG. 1 is a perspective view showing an appearance of the image forming apparatus in accordance with an embodiment of the present invention.

In the following description, the same components are denoted by the same reference characters. Their names and functions are also the same. Therefore, detailed description thereof will not be repeated.

In the embodiment of the present invention, the display operation device is used in combination with an image forming apparatus as one type of image processing apparatuses. It is noted, however, that application of the display operation device in accordance with the present invention is not limited to the image forming apparatus. The present invention is applicable to other apparatuses, such as an image processing apparatus, or to any electronic device that gives instructions of operation using a screen image.

In the following description, a software button is described as an example of the UI component. The present invention, however, is not limited to such an embodiment. The present invention is applicable to any UI component that can function as a trigger for activating or stopping any process in response to an operation.

An image forming apparatus 100 (see FIG. 1) described in the following has a display-integrated touch-panel (hereinafter simply referred to as a "touch-panel") as the display operation device.

The image forming apparatus forms an image on a sheet of recording paper by electro-photography. The image forming apparatus includes, as operational modes, copy mode, FAX mode, document filing mode (a mode in which a scanned image is stored in a storage device in the image forming apparatus) and mail mode (a mode in which a scanned image is transmitted attached to an electronic mail). The image forming apparatus 100 may further include network printer mode. The present invention is not limited to the above, and it may be any image forming apparatus including at least one of the four operational modes, that is, copy mode, FAX mode, document filing mode and mail mode, which requires, in at least one of the operational modes, an operation of pressing a button displayed on the touch-panel as a trigger of a task. The printing method is not limited to electro-photography.

[Configuration]

Figure 2:
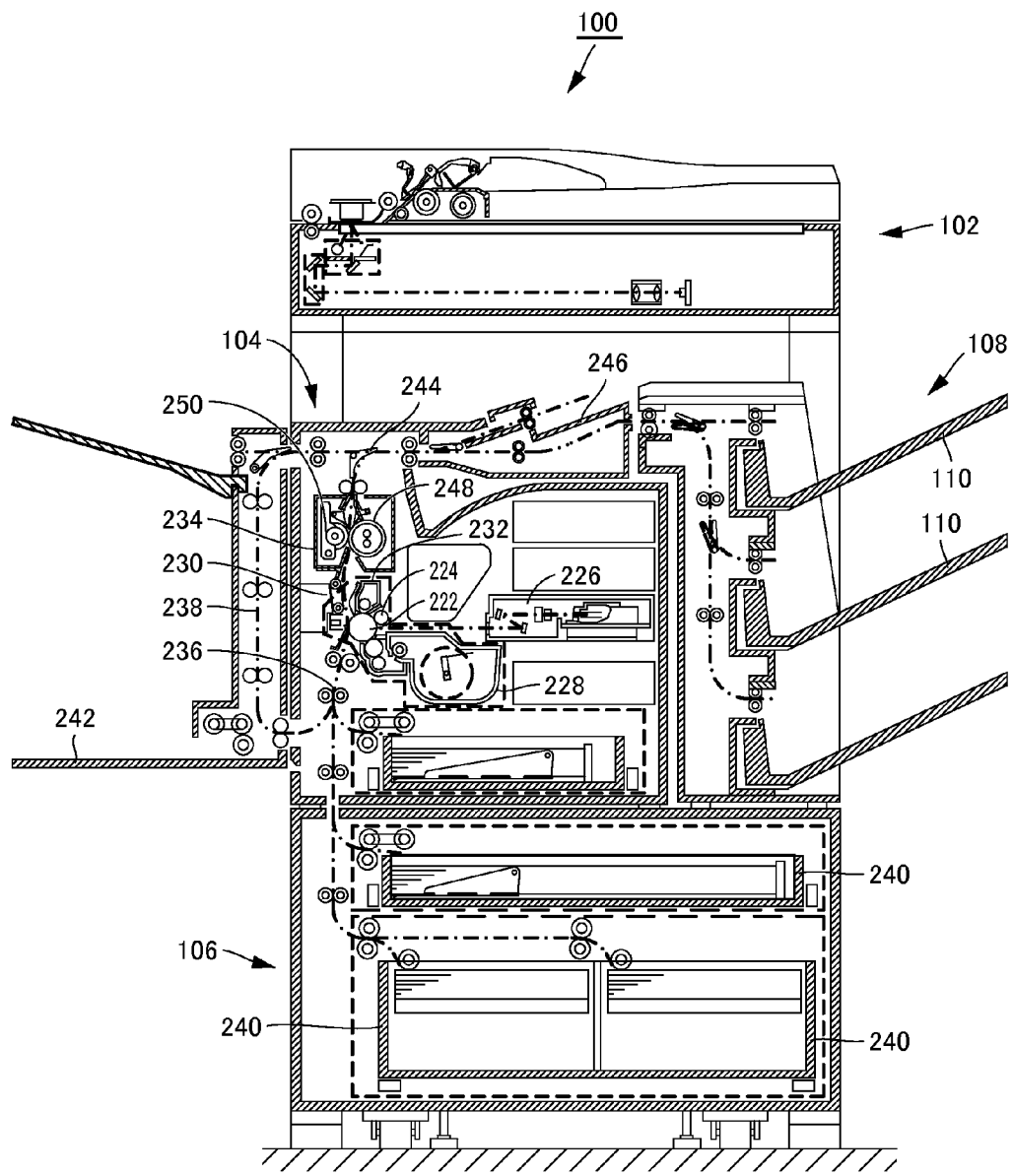
FIG. 2 schematically shows an internal configuration of the image forming apparatus shown in FIG. 1.
Figure 3:
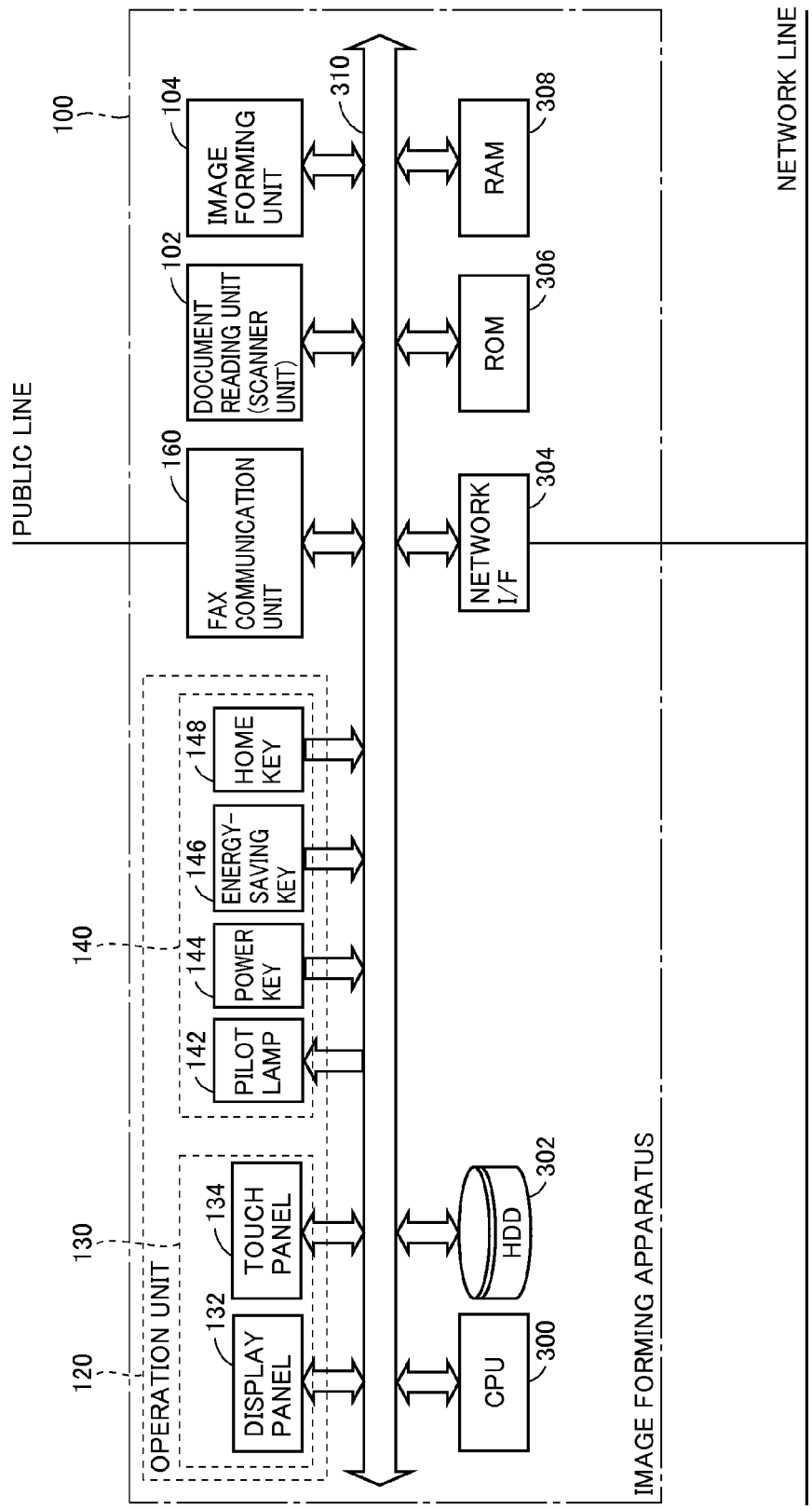
FIG. 3 is a block diagram showing a hardware configuration of the image forming apparatus shown in FIG. 1.

Referring to FIGS. 1 to 3, an image forming apparatus 100 in accordance with the present embodiment will be described.

Referring to FIGS. 1 to 3, image forming apparatus 100 includes a document reading unit 102, an image forming unit 104, a paper feed unit 106, a paper discharge unit 108 and an operation unit 120. Operation unit 120 includes a touch-panel display 130 (hereinafter simply referred to as "display 130") and a display operation unit 140. Display 130 includes a display panel 132 formed of a liquid crystal panel or the like, and a touch-panel 134 arranged on display panel 132. Touch-panel 134 detects that a user's finger is touching its surface and also detects the touched position. Display operation unit 140 includes a pilot lamp 142, a power key 144, an energy-saving key 146, and a home key 148 for returning the display screen image on display 130 to a home screen image. The home screen image is a screen image allowing the user to select various operational modes.

Figure 4:
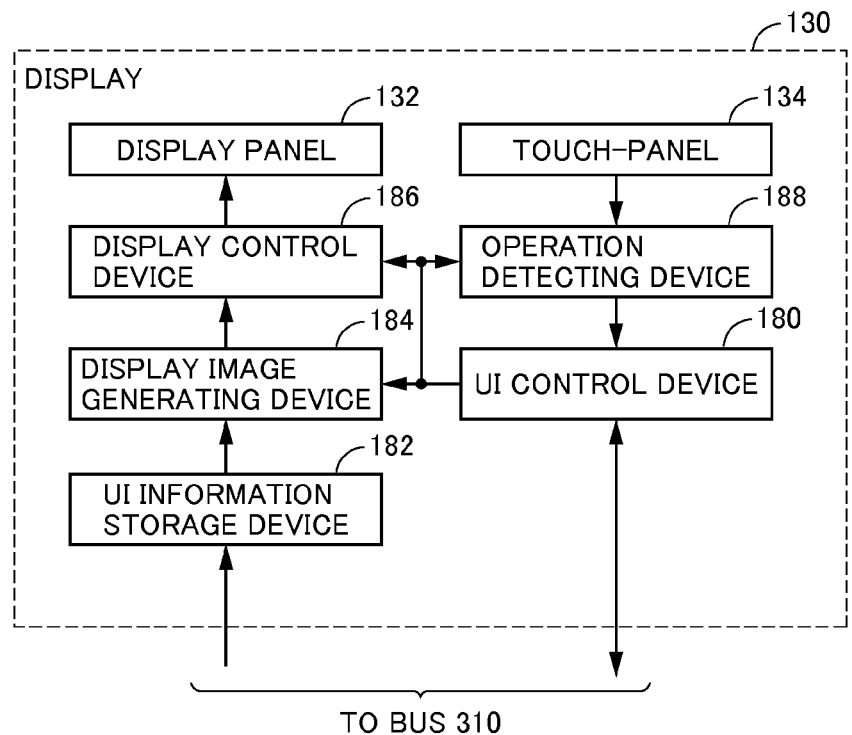
FIG. 4 is a block diagram of a display 130 of the image forming apparatus shown in FIG. 1.

Referring to FIG. 4, in addition to display panel 132 and touch-panel 134, display 130 more specifically includes: a UI (User Interface) control device 180, implemented by an embedded computer, connected to a bus 310 and executing a prescribed display control program to realize display transitions of various buttons as will be described later; a UI information storage device 182, connected to UI control device 180 and bus 310, for storing information related to various objects necessary for screen image display; and a display image generating device 184 connected to UI control device 180 and UI information storage device 182 for generating display images of various objects on the screen image to be displayed on display panel 132. Display 130 further includes: a display control device 186 connected to UI control device 180, display panel 132 and display image generating device 184 for controlling display panel 132 such that the display image generated by display image generating device 184 is displayed; and an operation detecting device 188 connected to touch-panel 134 and UI control device 180, for detecting the user touching touch-panel 134, outputting coordinates of the touched position and applying the output to UI control device 180. Based on the position coordinate information and the information related to the displayed image, UI control device 180 detects which button is operated by the user and what trajectory is drawn by the user's finger, and by interpreting these pieces of information, outputs the result to a CPU 300 in image forming apparatus 100 through bus 310.

Image forming apparatus 100 in accordance with the present embodiment is provided with display 130 as a main operation device, and, in addition, with display operation unit 140 including hardware keys and a pilot lamp. The keys (power key 144, energy-saving key 146 and home key 148) of display operation unit 140 are hardware buttons, different from the software buttons realized by display 130.

The present embodiment is characterized in that a button displayed when execution of a task such as document reading, facsimile transmission of a document or copying is instructed has its color changed in accordance with a change of the function.

In the present embodiment, if a button used as a trigger for executing a certain function serves as a button for another function similar to the certain function, the button color is changed to an analogous but not the same color as the original color. When the button is to be used as a button for a very much different function, the button color is changed to a color much different from the original color. Since the button color is changed in such a manner, the user can easily and intuitively determine whether the button function is similar to or different from the original function of the button.

Such a process is executed in any of the copy mode, mail mode, FAX mode and the document filing mode. In any of these modes, the manner of determining the color of button display is essentially the same.

In the following, first, the configuration of image forming apparatus 100 will be briefly described mainly with reference to the copy mode. Thereafter, the display transition at the time of document reading, in the facsimile mode and the copy mode will be described.

In the copy mode, mainly document reading unit 102 and image forming unit 104 operate.

In image forming apparatus 100, a document placed on a platen is read by document reading unit 102 as image data. The image data is subjected to various image processing operations, and the resulting image data is output to image forming unit 104.

Image forming unit 104 is for printing an image of the document represented by the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided, and a sheet of recording paper fed from paper feed unit 106 is fed along main feeding path 236. Paper feed unit 106 draws out sheets of recording paper stacked on a paper feed cassette 240 or on a manual feed tray 242 one by one, and feeds the sheet of paper to main feeding path 236 of image forming unit 104.

While the sheet of recording paper is fed along main feeding path 236 of image forming unit 104, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operational mode is changed to the energy saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

Referring to FIG. 3, image forming apparatus 100 further includes: operation unit 120 allowing setting of functions related to the copy mode, facsimile mode, document filing mode and mail mode; ROM (Read Only Memory) 306 for storing programs and the like; a hard disk drive (hereinafter denoted as HDD) 302 as a non-volatile storage area capable of storing programs and data even when power is cut off; and an RAM (Random Access Memory) 308 providing a storage area when a program is executed.

Image forming apparatus 100 further includes a bus 310 connected to document reading unit 102, image forming unit 104, FAX communication unit 160, operation unit 120, ROM 306, HDD 302, and RAM 308, and CPU (Central Processing Unit) 300 connected to bus 310, realizing general functions as the image forming apparatus.

HDD 302 stores files of image data of documents read by image forming apparatus 100, folder by folder, together with date and time of saving and name of the user who saved.

ROM 306 stores programs and data necessary for controlling operations of image forming apparatus 100. CPU 300 controls image forming apparatus 100 in accordance with the programs and data stored in ROM 306, and executes control related to various functions of image forming apparatus 100.

As shown in FIG. 3, a public line is connected for transmitting/receiving image data, to FAX communication unit 160. To network interface 304, a network line is connected. To the network line, a computer or the like using image forming apparatus 100 as a network-supported printer may be connected, or a computer or the like identified by a URL (Uniform Resource Locator) designated through the Internet may be connected. When connected to the Internet, image forming apparatus 100 can obtain necessary information through the Internet.

RAM 308 provides a function of a working memory for temporarily storing results of operations and processes by CPU 300, and a function of a frame memory for storing image data.

CPU 300 controls document reading unit 102, image forming unit 104, display 130 and display operation unit 140 forming operation unit 120, ROM 306, HDD 302 and RAM 308 by executing a prescribed program or programs. Operation unit 120 communicates with CPU 300 through an input/output interface.

Operation unit 120 is formed of a plate-shaped panel provided in an inclined manner to be easily viewable by the user. On a surface of operation unit 120, display 130 is provided on the left side area, and display operation unit 140 (pilot lamp 142 and power key 144, energy-saving key 146 and home key 148 as hardware buttons) is provided on the right side area. Display 130 and display operation unit 140 form operation unit 120 as one integrated body as a whole.

As described above, display 130 is formed of display panel 132 and touch-panel 134 arranged on display panel 132. On display panel 132 of display 130, a home screen image allowing selection of an operational mode of image forming apparatus 100, current state of image forming apparatus 100, status of destination designation, and status of job processing are displayed. On a display area of display panel 132, selection buttons as software buttons are displayed. When a portion where the selection button is displayed is pressed by a finger, touch-panel 134 detects the pressed position and outputs information indicating the position. By comparing the display position of the selection button and the position where the touch-panel 134 is pressed using a program, selection of an operational mode, setting of a function, and instruction of an operation of image forming apparatus 100 become possible. In addition to such a touch operation (command input operation based on the position of pressing by the user), image forming apparatus 100 also allows gesture operation (command input operation based on trajectory of operation by the user) as described above.

Pilot lamp 142 of display operation unit 140 is, for example, an LED (Light Emitting Diode). It is turned on/off (/flickered) under the control of CPU 300. When the user presses power key 144 provided separate from a main power switch, image forming apparatus 100 makes a transition from a standby mode (in which, for example, only the FAX receiving operation is possible with the main power on) to a normal mode, and pilot lamp 142 is turned and kept on. If a predetermined time passes without any user operation, or if the user presses energy-saving key 146, image forming apparatus 100 makes a transition from the normal mode to the energy saving mode, and pilot lamp 142 flickers. Further, if the user presses energy-saving key 146 in the energy saving mode, the image forming apparatus 100 makes a transition from the energy saving mode to the normal mode. Home key 148 is a hardware key for returning the display of display 130 to the initial state (home screen image).

Image forming apparatus 100 in accordance with the present embodiment includes the four operational modes (copy mode, facsimile mode, document filing mode and mail mode) as described above. On display 130, software buttons for setting functions in respective operational modes are displayed, and buttons for setting a destination or a preview as an expected image, for example, are displayed as needed.

On memo display area 354, a piece of maintenance information or the like to be notified to every user of image forming apparatus 100 is displayed.

[Layout of Copy Basic Screen Image]

Figure 5:
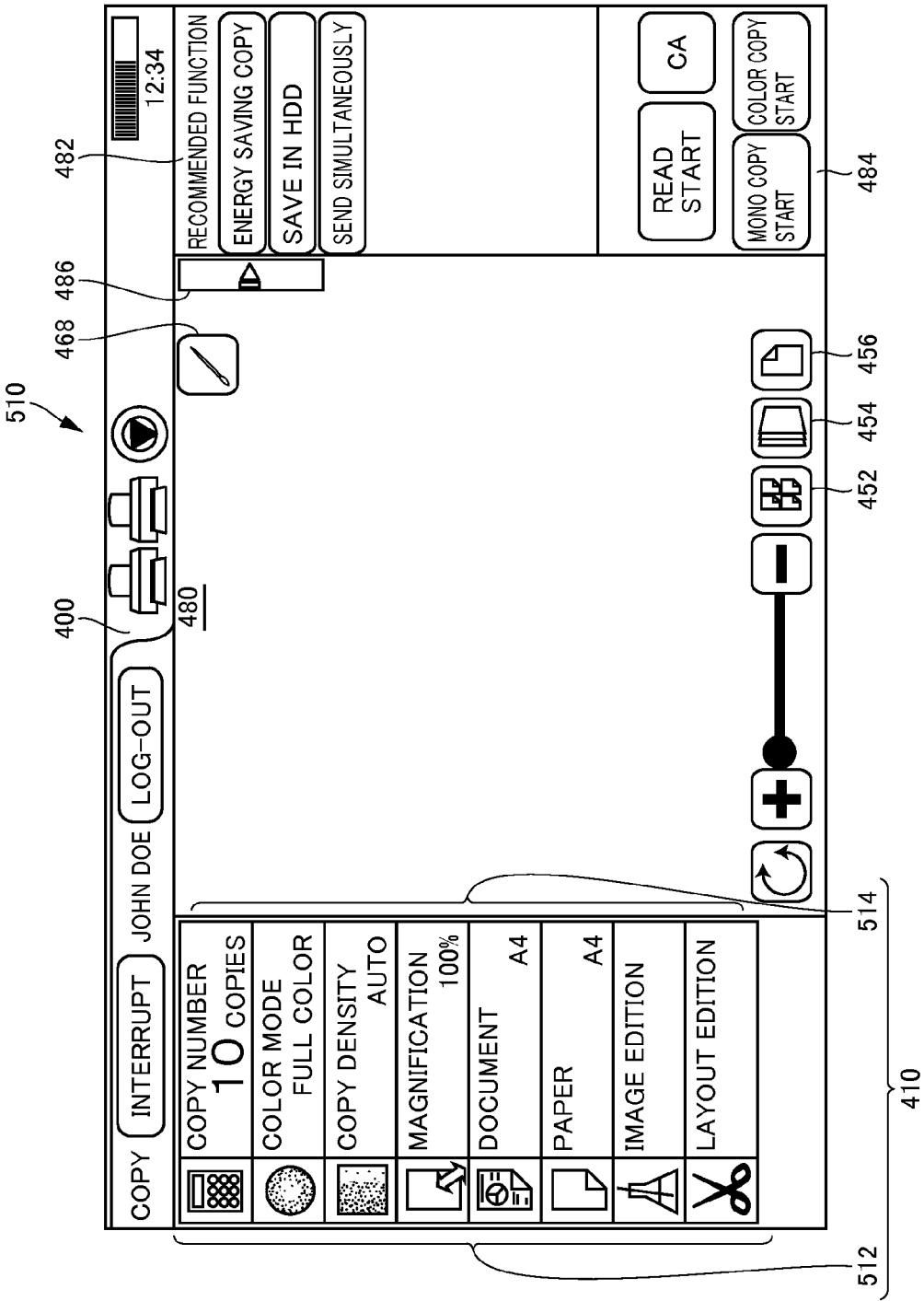
FIG. 5 shows an initial screen image in the copy mode, of a preview display of the image forming apparatus.

FIG. 5 shows a basic layout in the copy mode operation (referred to as a "copy basic screen image") 510 on display 130. The copy basic screen image 510 is first displayed when the copy mode is selected. One characteristic of the present embodiment is that, basically, preview is possible in all screen images including the copy basic screen image. Similar image preview can be selected at the time of facsimile transmission, image transmission by mail or image filing. In any of these operational modes, basic screen image configuration related to preview display is the same. Therefore, in the following, only the copy basic screen image will be described.

Referring to FIG. 5, let us consider display 130 of landscape layout (for example, width of 1024 pixels×length of 600 pixels). System area 400 is arranged at the uppermost portion, and preview area 480 is arranged at the center, of the screen image. On the left side of preview area 480, function selecting area 410 for setting a function and confirming the contents of function is arranged. On the upper right side of preview area 480, an area referred to as an action panel area (herein after referred to as "action panel area 482") is arranged. On a lower right side of preview area 480, task trigger area 484 is arranged. These areas have their sizes changed in accordance with the preview display modes, as will be described later.

On system area 400, the current state of image forming apparatus 100 is displayed and, in addition, the title of operational mode that is being operated and status/state of image forming apparatus 100 are displayed. By way of example, on system area 400, an operational mode name, an interruption key, a log-in user name, status of a currently processed job, state of use of an internal memory, time and the like are displayed.

On function selecting area 410, a function selection menu (icons, buttons, setting items screen image, and a function list screen image) to be operated by the user for setting each function, switching display and confirming setting, is displayed. These are for setting conditions of data conversion and conditions at the time of executing a task, on the image data of the document. On function selecting area 410, a group of functional icons 512 and a group of texts 514 describing the function of each functional icon are displayed.

In preview area 480, an image of expected document output (finished form) is displayed. Every time the user designates the manner of finish, the image displayed on preview area 480 changes. At the time of reading, the read document image is displayed.

Preview area 480 includes a group of preview change buttons at a lower portion, for changing display style of preview area 480. The group of preview change buttons includes: a rotation button for rotating the preview by a desired angle; a zoom bar for enlarging/reducing the preview image; a document display mode button 452 instructing change to a document display mode, as will be described later; a finish preview button 454 instructing a change to a finish preview screen image; and a fit-to-screen button 456 instructing a change to the fit-to-screen mode. At an upper right portion of preview area 480, an image edition button 468 is arranged, for instructing a change to an image edition mode allowing edition of documents.

If the number of pages of document images to be displayed on preview area 480 is large, a page selection button (page number input button, page feed button, page return button, single page display button, plural page display button and the like), not shown, is displayed. When the document image displayed on preview area 480 is flicked, the document page can be fed forward or backward. If the document image displayed on preview area 480 is large, a scroll bar that can be touch-operated or gesture-operated is displayed.

On action panel area 482, pieces of information related to assistance, guidance and suggestion related to the operation are displayed. If, for instance, a user selects a specific function, on action panel area 482, functions related to the selected function may be displayed. Other functions related to the same object of the selected function may be displayed. Further, functions selected in the past by the user or a user of a group to which the user belongs in relation to the selected function may be displayed as "recommended functions."

On the left side of action panel area 482, an action panel reducing button 486 is displayed, which is operated by the user when action panel area 482 is to be displayed in reduced size. When action panel reducing button 486 is pressed, action panel area 482 is reduced in size and displayed in the form of buttons on the right side of the screen image. When the button is pressed, action panel area 482 is again displayed in the enlarged size. Specifically, the user can reduce or enlarge the action panel area 482 by pressing the button. Accordingly, the preview area 480 is enlarged or reduced. Confirmation of preview image and confirmation of operation hints can be done easily in accordance with the user's intention.

In task trigger area 484, items (software buttons as one type of UI components) as triggers for starting certain processes of image forming apparatus 100 are displayed. These items are displayed when all settings are completed in a certain operational mode and image forming apparatus 100 is ready to operate actually. By way of example, on task trigger area 484, a read start button, a monochrome copy start button, a color copy start button and a clear-all button (CA) are displayed. The read start button is a button for starting a process for once reading a document and providing a preview in copying or FAX transmission. The monochrome copy start button is a button for starting a process for reading a document and immediately forming a monochrome image thereof on a sheet of recording paper, or for starting the process of forming a monochrome image on a sheet of recording paper based on once read image. The color copy start button is similarly a button for starting the process of immediately forming a color image of the document, or for starting the process of forming a color image on a sheet of recording paper based on once read image. The clear-all button is a button for clearing all pieces of input information. When the clear-all button is pressed at the time of document reading, all documents that have been read are cleared, and the screen image returns to the copy initial screen image.

In the present embodiment, when a button alternately takes two functions, the button color is changed depending on whether the functions are similar to or different from each other.

Figure 6:
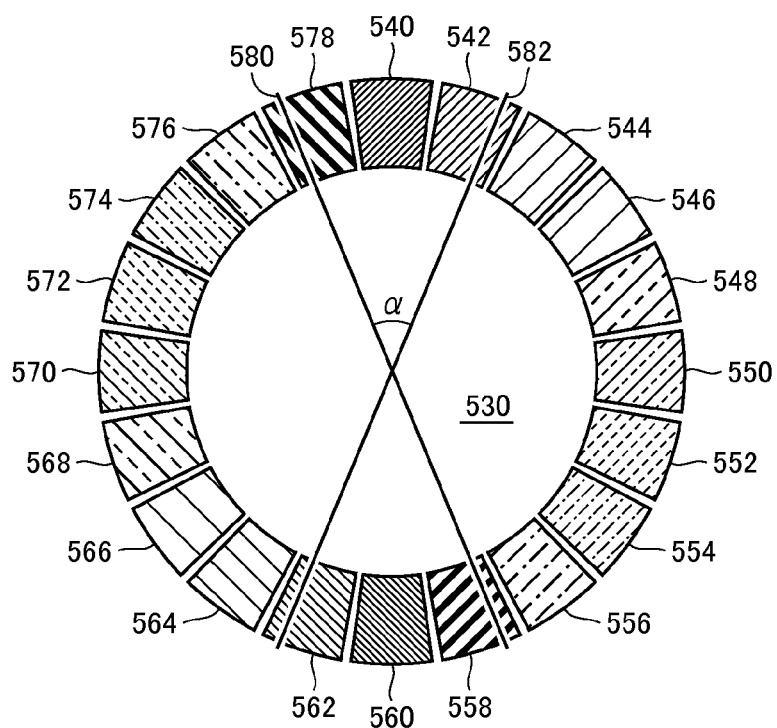
FIG. 6 shows an example of a color circle.

Referring to FIG. 6, using a color circle 530, the manner of determining button color will be described. In color circle 530 shown in FIG. 6, hue is divided into twenty (20) blocks of color 540, . . . , 578. Each block represents one hue. In color circle 530, colors opposite to each other with the center of the circle positioned in-between are complementary colors. By way of example, color 540 and color 560 are complementary to each other. In color circle 530, colors that are complementary colors to each other are denoted by hatchings in line symmetry. In color circle 530, colors adjacent to each other (for example, colors 540 and 542, colors 540 and 578) are referred to as analogous colors.

Color circle 530 shown in FIG. 6 includes colors arranged divided into 20 blocks. It is noted that the number of blocks forming the color circle is not limited to 20 but may be 8, 40 or others, and the manner of division is not fixed. Originally, the color circle arranges hues that change continuously on a circle, and division into blocks is not absolutely necessary. Therefore, definition of an analogous color poses a problem. In the present embodiment, colors commonly encompassed in a sector arc formed by a certain central angle α of the color circle as defined, for example, by lines 580 and 582 in FIG. 6 will be referred to as analogous colors. Specific manner is as follows. It is difficult to determine the central angle α in a single and uniform way, since it defines the range of analogous colors and whether the colors are analogous depends on one's sense. Here, for a certain color on the color circle, a color included in a sector arc having the central angle of α=45°, as represented by mutually intersecting lines 580 and 582 will be referred to as an analogous color to the certain color. Outside this range, it is difficult to feel the color is analogous. Considering such a definition, it may be desirable not to limit a complementary color of a certain color to the strict complementary color, but to include a color that is positioned opposite to the certain color on the continuous color circle (that is, the strict complementary color) and the analogous color thereof.

In the present embodiment, if a button alternately assumes two functions, the button color is changed to mutually analogous colors if the functions are similar to each other, and the button color is changed to mutually complementary colors or colors analogous to the complementary color if the functions are different. In the following, transition of button display colors will be described specifically with reference to FIGS. 7 to 12.

Figure 7:
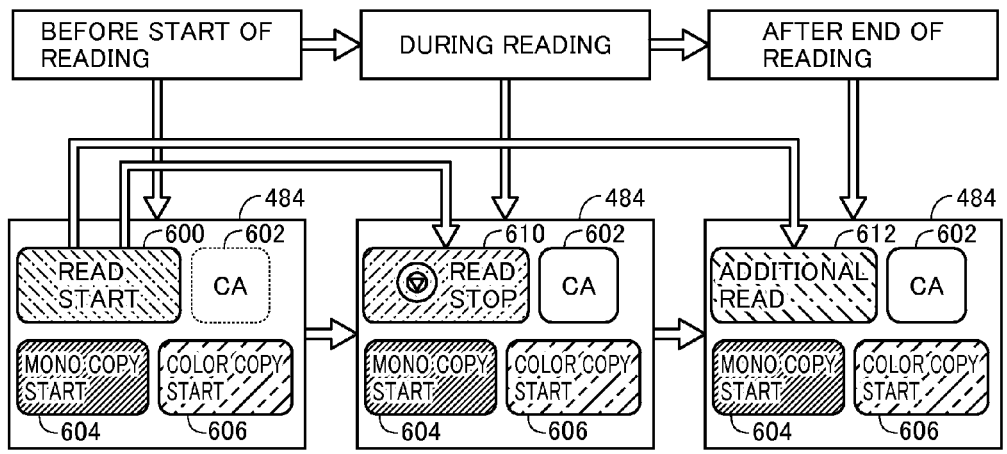
FIG. 7 shows display transitions of a task trigger area, when a document reading process is executed in the image forming apparatus shown in FIG. 1.

Referring to FIG. 7, at the time of document reading, the display on task trigger area 484 changes in the following manner. With reference to the left side of FIG. 7, on task trigger area 484, read start button 600, clear-all button 602, monochrome copy start button 604 and color copy start button 606 are displayed as described above. These are displayed at positions different from each other and not overlapping with each other. Based on the color circle 530 of FIG. 6, the colors of respective buttons are as follows. The background portion of read start button 600 is color 574; the background portion of clear-all button 602 is yellow (before the start of reading, clear-all button 602 is not usable and, therefore, it is grayed out); the background portion of monochrome copy start button 604 is color 540; and the background portion of color copy start button 606 is color 548.

Assume, for example, that the user pressed read start button 600 for reading a document. During reading, the task trigger area 484 is as shown at the center of FIG. 7. Specifically, read start button 600 is changed to read stop key 610. Read stop key 610 and read start button 600 are displayed at the same position in the same size and same shape. Therefore, when these two were superposed, background portions of these would be substantially superposed. The function of read stop key is to stop reading. Therefore, the function of read stop key 610 is just the opposite of the function of read start button 600. The background of read stop key 610 is displayed in color 554, which is complementary to the display color 574 of the background of read start button 600.

When reading ends, an additional read key 612 is displayed in place of read stop key 610. The function of additional read key 612 is to read a document image in addition to the document read immediately before, and to save the images as continuous document images. This function may be regarded as a function of resuming the process of which execution is started by pressing read start button 600, once the process is completed. These functions are similar to each other. Therefore, additional read key 612 is displayed in color 576, which is different from but analogous to the color 574 of read start button 600.

As described above, if the function of a button displayed at the same position in the same shape is changed to a function of opposite nature, the button comes to be displayed in a color very much different from the original color, and if the function is changed to a similar function, the button is displayed not in the same color but in an analogous color. As a result, the user can easily and intuitively know how the function of the button has been changed (whether it is changed to a different function or to a similar function).

Figure 8:
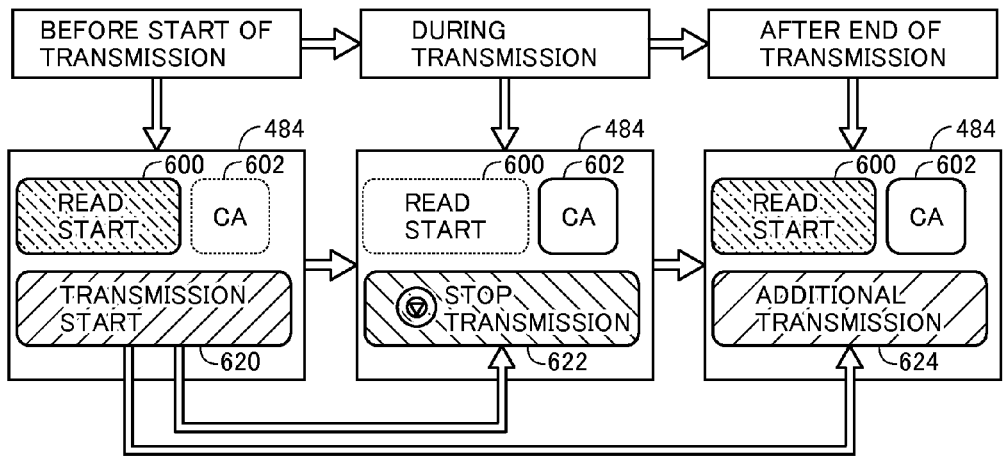
FIG. 8 shows display transitions of the task trigger area, when a facsimile transmission process is executed in the image forming apparatus shown in FIG. 1.

FIG. 8 shows display transitions of task trigger area 484 at the time of facsimile transmission. Referring to FIG. 8, at the start of facsimile transmission, on task trigger area, read start button 600, clear-all button 602 and transmission start button 620 are displayed. In the present embodiment, transmission start button 620 is displayed in color 544 shown in FIG. 6. As in the example of FIG. 7, clear-all button 602 is grayed out.

When the user operates transmission start button 620, facsimile transmission starts. Here, as shown at the center of FIG. 8, read start button 600 becomes inoperable and grayed-out. Further, in place of transmission start button 620, a transmission stop button 622 is displayed at the same position and in the same shape. Transmission stop button 622 is to stop transmission, and it has a function opposite to the function of transmission start button 620. Therefore, in the present embodiment, transmission stop button 622 is displayed in color 564, which is a complementary color to color 544 of transmission start button 620.

When facsimile transmission ends, read start button 600 is again becomes operable. Further, in place of transmission stop button 622, an additional transmission button 624 is displayed at the same position and in the same shape. Additional transmission button 624 is a button operated when an additional document is to be transmitted to the same destination as the immediately preceding facsimile transmission. Specifically, the function of additional transmission button 624 is different from but similar to the function of transmission start button. Therefore, in the present embodiment, additional transmission button 624 is displayed in color 546, which is analogous to the display color 544 of transmission start button 620.

Figure 9:
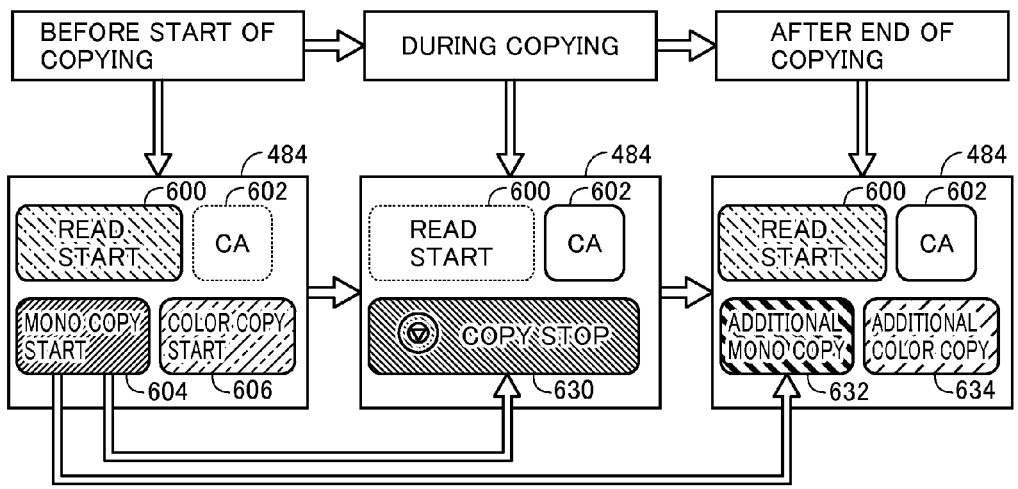
FIG. 9 shows display transitions of the task trigger area, when a monochromatic (black and white) copy process is executed in the image forming apparatus shown in FIG. 1.

Referring to FIG. 9, at the start of copying, on task trigger area 484, read start button 600, clear-all button 602, monochrome copy start button 604 and color copy start button 606 are displayed. Here, when the user operates monochrome copy start button 604, a copy stop button 630 is displayed in place of (superposing) monochrome copy start button 604 and color copy start button 606. When the copy is completed, an additional monochrome copy start button 632 and an additional color copy start button 634 are displayed. Here, copy stop button 630 is displayed in color 560 (see FIG. 6), which is a complementary color of display color 540 of copy start button 604, additional monochrome copy start button 632 is displayed in color 578, which is an analogous color of monochrome copy start button 604, and additional color copy start button 634 is displayed in color 548, which is an analogous color of color copy start button 606.

Figure 10:
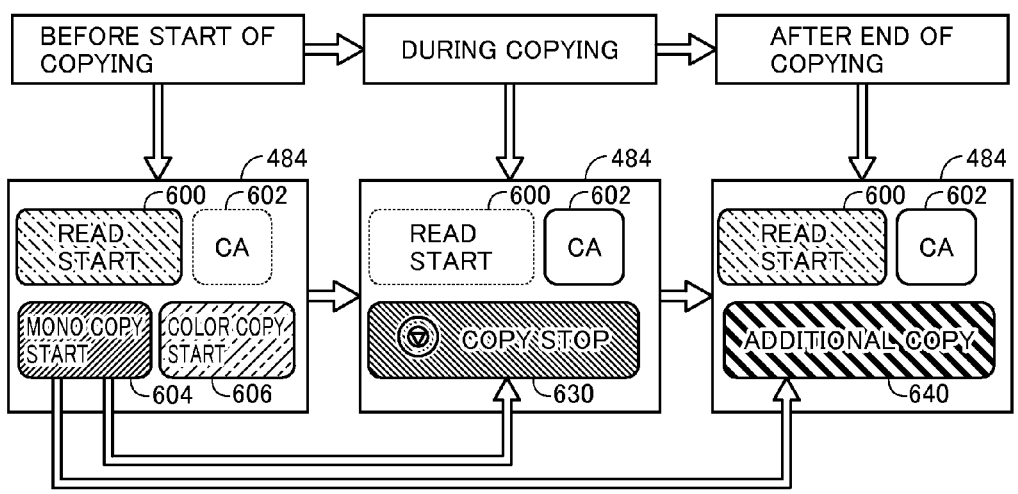
FIG. 10 shows another example of display transitions of the task trigger area, when a monochromatic copy process is executed.
Figure 11:
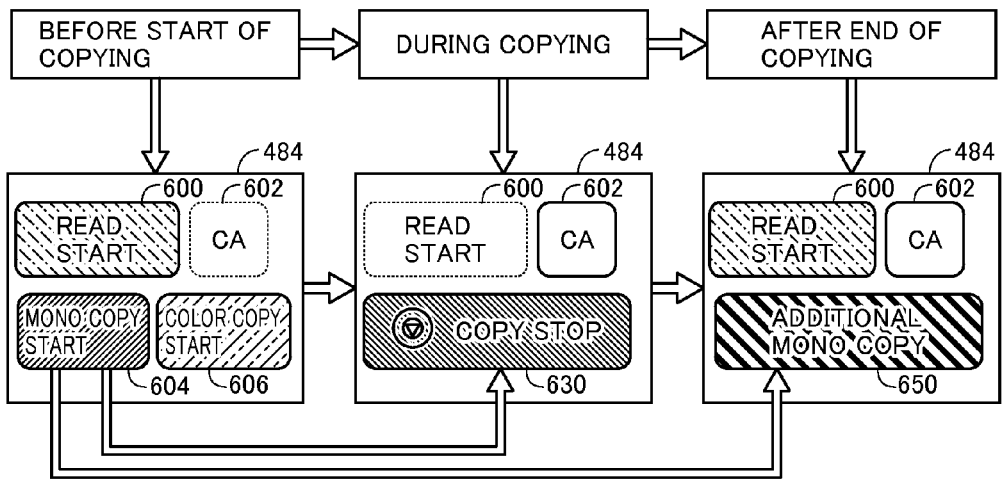
FIG. 11 shows a further example of display transitions of the task trigger area, when a monochromatic copy process is executed.

The display transition of task trigger area 484 at the time of copying is not limited to the example above. For instance, as shown in FIG. 10, when the copy ends, an additional copy button 640 may be displayed at the same position and in the same shape as copy stop button 630, in place of additional monochrome copy start button 632 and additional color copy start button 634 shown in FIG. 9. Here, additional copy button 640 has a function that, when operated, an additional copy is taken in the same copy mode as the initially pressed button (monochrome copy start button 604 or color copy start button 606). It is noted, however, that the display color of this button is, in the present embodiment, a color analogous to the color of initially operated button. In the example of FIG. 10, additional copy button 640 is displayed in color 578 (or 542) analogous to the monochrome copy start button 604.

Figure 12:
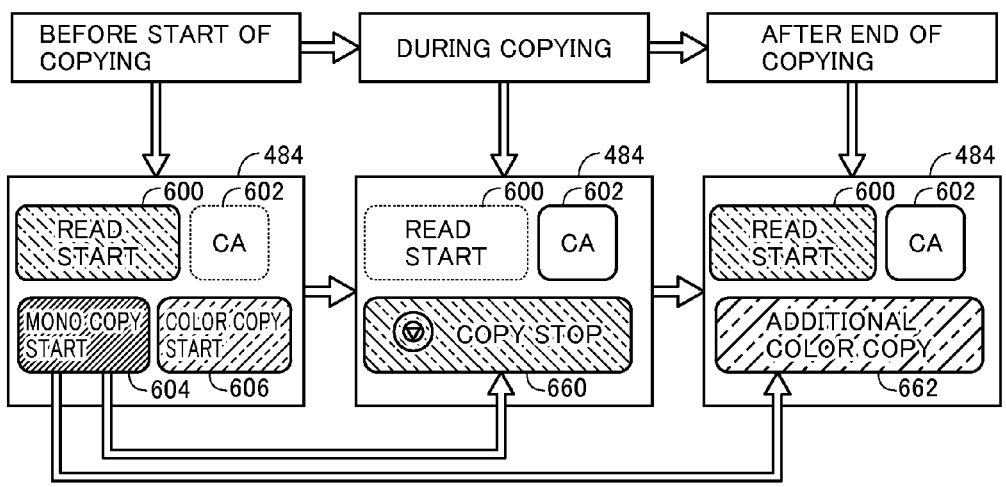
FIG. 12 shows display transitions of the task trigger area, when a color copy process is executed.

The same applies when the additional copy is limited to the same mode (monochrome or color) as the function of initially pressed button. In the example shown in FIG. 11, in place of additional copy button 640 shown in FIG. 10, a monochrome additional copy button 650 is displayed. Different from additional copy button 640, monochrome additional copy button 650 is to make an additional copy in black and white. In the same example, if color copy start button 606 is operated, the display color of copy stop key 660 is set to a complementary color to the display color of copy start button 606, and the display color of additional color copy start button 662 displayed after the completion of copying is set to an analogous color to the display color of color copy start button 606, as shown in FIG. 12.

As described above, when a certain button is replaced by a button having a very different function displayed at the same position, the button is displayed in a very much different color. When the certain button is replaced by a button having a similar function, the button is displayed in an analogous color. By such an approach, it becomes possible to easily and intuitively understand whether the function of the button displayed at the same position is different from or similar to the button displayed previously.

[Program Structure]

<Reading and Copy Process>

The display transitions of task trigger area 484 described above are realized by a program executed by a CPU, not shown, in UI control device 180 of display 130 shown in FIG. 4. In the following, as an example of such a program, the control structure of a program for document reading and copy processing, of which display transitions are shown in FIG. 7, will be described with reference to FIG. 13. The program is started when the user operates read start button (see FIG. 7) on task trigger area 484. Before the user operation, the display of task trigger area 484 is as shown on the left side of FIG. 7.

Figure 13:
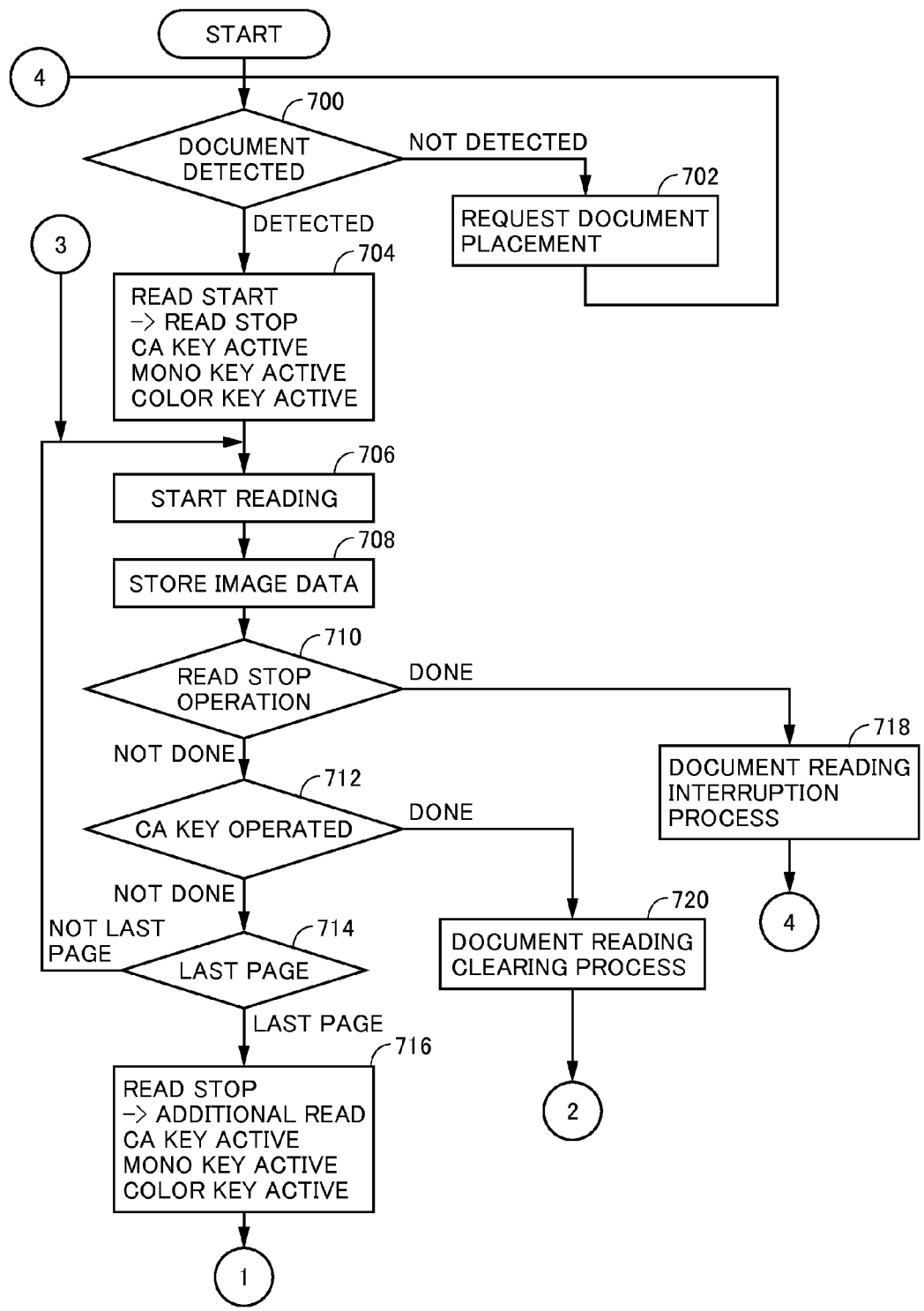
FIGS. 13 and 14 are flowcharts realizing display transitions of the task trigger area such as shown in FIG. 8, in the image forming apparatus shown in FIG. 1.

Referring to FIG. 13, the program starts at step 700, and includes step 700 of detecting a document in a tray of a document reading device, a step 702 executed if the detection of any document failed, of requesting the user to place a document on the tray and to return the control to step 700.

If a document is detected at step 700, the control proceeds to step 704. At step 704, as shown at the center of FIG. 7, read stop key 610 is displayed in place of read start button 600. Read stop key 610 is displayed at the same position, in the same shape and in the same size as read start button 600. It is noted that it is displayed in a color complementary to the display color of read start button 600, as described above. Further, at step 704, the display of clear-all button 602 is changed from grayed-out state to the normal display, indicating that clear-all button is active. Monochrome copy start button 604 and color copy start button 606 are also in an active display state.

Thereafter, at step 706, reading of one page of the document is executed. At this time, UI control device 180 sends a signal indicating that reading of document has been instructed, to CPU 300. In response to the signal, CPU 300 operates document reading unit 102, to start reading of the document. At step 708, the read image is stored in HDD 302 shown in FIG. 3.

Thereafter, whether or not an operation to stop reading has been made is determined. Specifically, whether read stop key 610 shown at the center of FIG. 7 has been pressed or not is determined. If the determination is positive, the control proceeds to step 718. At step 718, a document reading interruption process takes place, and the control returns to step 700. The document reading interruption process is a process to have the overall condition of image forming apparatus 100 returned to the state immediately before the instruction of document reading (or additional reading of document) was made the last time. After step 718, the control proceeds to step 700.

If the determination at step 710 is negative, the control proceeds to step 712. At step 712, whether or not the CA key has been operated is determined. If the determination is positive, the control proceeds to step 720. At step 720, not only the read document data but also settings are all cleared. Thereafter, the control returns to step 700.

Figure 14:
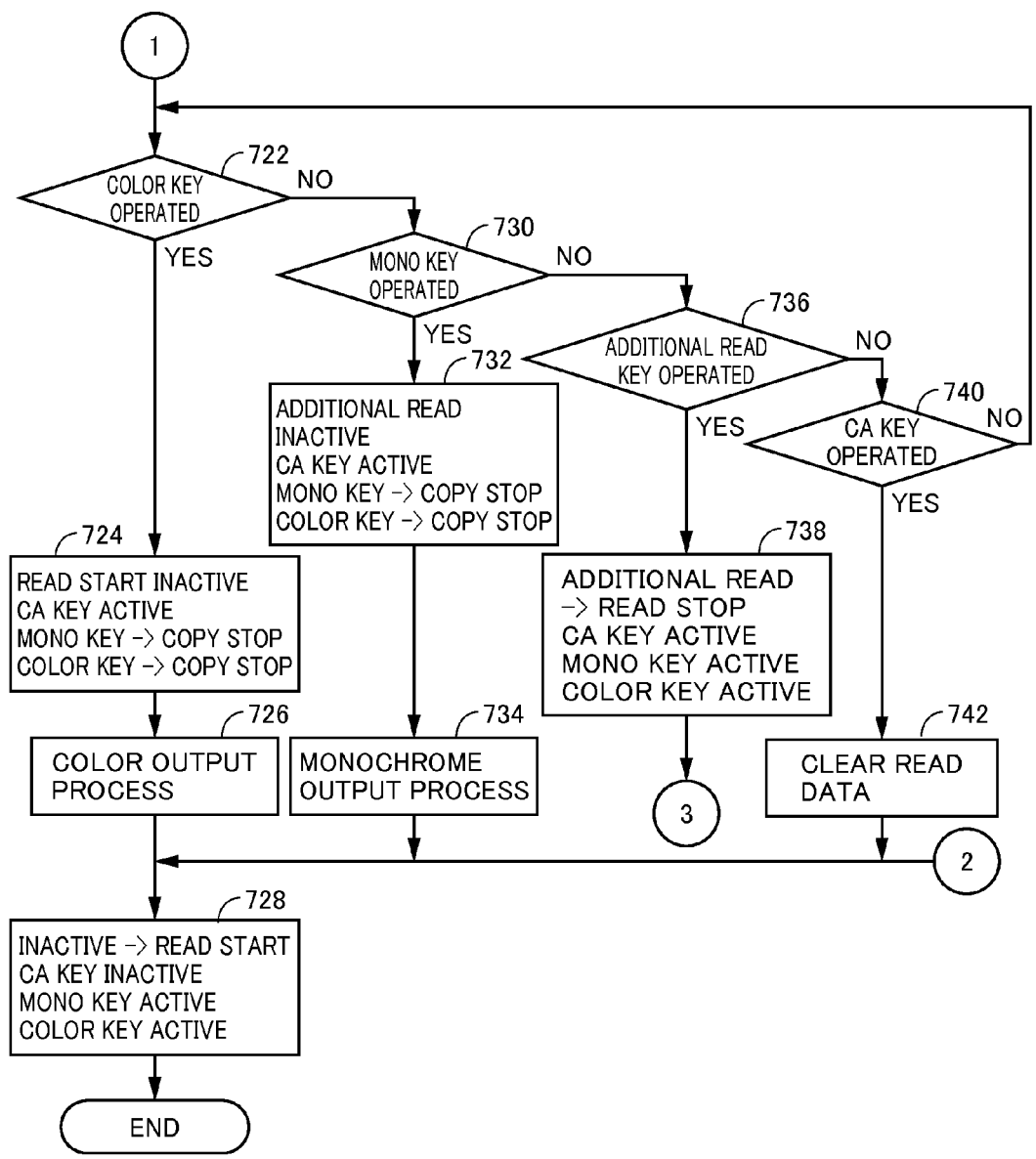

If the determination at step 712 is negative, the control proceeds to step 714. At step 714, whether or not the read page is the last page is determined. If the determination is negative, the control proceeds to step 706. If the determination is positive, the control proceeds to step 728 (FIG. 14). The process following step 728 will be described later.

If the determination at step 714 is negative, the control returns to step 706. If the determination at step 714 is positive, the control proceeds to step 716.

At step 716, the display transition from the center to the right side of FIG. 7 takes place. In place of read stop key 610, additional read key 612 is displayed at the same position, in the same size and in the same shape. The color of additional read key 612 is much different from the display color of read stop key 610, and it is an analogous color of the display color of read start button 600. Clear-all button 602, monochrome copy start button 604 and color copy start button 606 are all active. Thereafter, the control proceeds to step 722 shown in FIG. 14.

At step 722, whether or not color copy start button 606 has been operated is determined. If the determination is positive, the control proceeds to step 724. If the determination is negative, the control proceeds to step 730.

At step 724, additional read key 612 becomes inactive, and grayed-out. Clear-all button 602 remains active. In place of monochrome copy start button 604 and color copy start button 606, copy stop button 630 is displayed as shown at the center of FIG. 9 (it is noted that FIG. 9 simply shows display transition during copying, and it shows an example different from the copy output after reading as currently described). Thereafter, at step 726, the process of outputting the document read by that time in color is executed. Finally, the process of returning the display of task trigger area 484 to the left side of FIG. 7 is executed at step 728, and the process ends. Specifically, at step 728, read start button 600 is activated, clear-all button 602 is inactivated, and both monochrome copy start button 604 and color copy start button 606 are activated.

On the other hand, if the determination at step 722 is negative, at step 730, whether or not monochrome copy start button 604 has been operated is determined. If the determination is positive, the control proceeds to step 732. If the determination is negative, the control proceeds to step 736.

At step 732, as at step 724, additional read key 612 is inactivated, clear-all button 602 is activated, and in place of monochrome copy start button 604 and color copy start button 606, a copy stop button 630 such as shown at the center of FIG. 9 is displayed. Thereafter, at step 734, the process of outputting document images that have been read and stored in black and white is executed. Thereafter, the control proceeds to step 728 described above.

If the determination at step 730 is negative, at step 736, whether or not additional read key 612 has been operated is determined. If the determination is positive, the control proceeds to step 738. If the determination is negative, the control proceeds to step 740.

At step 738, additional read key 612 is changed to read stop key 610 as shown at the center of FIG. 7. Clear-all button 602 is activated. Monochrome copy start button 604 and color copy start button 606 are both activated. Thereafter, the control proceeds to step 706 of FIG. 1.

If the determination at step 736 is negative, whether or not clear-all button 602 has been operated is determined at step 740. If the determination is positive, the control proceeds to step 742. If the determination is negative, the control returns to step 722.

At step 742, all document image data read by that time are cleared, and the control proceeds to step 728.

<Copy Process>

The control structure for copying a document without storing the read document will be described with reference to FIG. 15. The display transitions of task trigger area 484 at this time are as shown in FIG. 9. Initially, task trigger area 484 is in such a state as shown on the left side of FIG. 9.

Referring to FIG. 15, the program starts when the user presses monochrome copy start button 604 or color copy start button 606. First, at step 750, whether or not there is any document in the tray portion of document reading unit is detected. If any document is detected, the control proceeds to step 754, and if not, the control proceeds to step 752. At step 752, a message asking the user to place a document on the tray is displayed, and the control returns to step 750.

At step 754, the display of task trigger area makes a transition to such a state as shown at the center of FIG. 9. Specifically, read start button 600 becomes inactive and grayed-out. Clear-all button 602 becomes active. Monochrome copy start button 604 and color copy start button 606 become invisible on the screen image, while a copy stop button is displayed at a position and in a size superposing these buttons. Thereafter, the control proceeds to step 756. At step 756, reading of one page of the document is executed. At the following step 758, the read document image is stored in HDD 302. At step 760, whether or not clear-all button 602 has been operated is determined. If the determination is positive, the control proceeds to step 766. At step 766, document reading stopping process of stopping reading of the document and discarding the document read by that time is executed. Then, execution of the program ends.

On the other hand, if the determination at step 760 is positive, at step 762, whether or not the read document is the last page is determined. If the determination is positive, the control proceeds to step 764, and if it is negative, the control returns to step 756.

At step 764, read start button 600, which has been inactivated, is reactivated, and clear-all button 602 is also activated. Copy stop button 630 is erased, and additional monochrome copy start button 632 and additional color copy start button 634 are displayed. Additional monochrome copy start button 632 and additional color copy start button 634 are displayed in colors analogous to the colors of monochrome copy start button 604 and color copy start button 606, respectively.

The program for facsimile transmission may be realized by a program having a structure similar to that shown in FIGS. 13 and 14. Therefore, details thereof will not be repeated here.

[Operation]

Image forming apparatus 100 operates in the following manner. In the following description, only the portion related to display transition of task trigger area 484 will be described.

<Document Reading and Copy>

Referring to FIG. 7, on task trigger area 484, read start button 600, clear-all button 602, monochrome copy start button 604 and color copy start button 606 are displayed. Of these, clear-all button 602 is inactivated and grayed-out. The display color of read start button 600 is color 574 shown in FIG. 6. The display colors of monochrome copy start button 604 and color copy start button 606 are colors 540 and 548 shown in FIG. 6, respectively.

Assume that the user placed a document on a document tray of document reading unit 102 and pressed read start button 600. The determination at step 700 of FIG. 13 is positive. At step 704, in place of read start button 600, read stop key 610 is displayed, and clear-all button 602 is activated. Monochrome copy start button 604 and color copy start button 606 are unchanged. The color of read stop key 610 is color 554 shown in FIG. 6, which is a complementary color to the display color 574 of read start button 600. Since read stop key 610 of which display color is very much different is displayed in place of read start button 600, it is possible for the user to easily understand that the function of read stop key 610 is very much different from the function of read start button 600.

At step 706, one page of document image is read, and at step 708, the image is stored in HDD 302. If the user does not operate read stop key 610 or clear-all button 602, the process steps 706, 708, 710, 712 and 714 are repeated until the last page. When all pages of the document are read, the determination at step 714 becomes positive. At step 716, additional read key 612 is displayed in place of read stop key 610. Clear-all button 602, monochrome copy start button 604 and color copy start button 606 are activated. The display color of additional read key 612 is color 576 shown in FIG. 6, which is analogous to the display color 574 of read start button 600. Therefore, it is possible for the user to easily understand that the function of additional read key 612 is similar to the function of read start button 600.

Thereafter, when the user operates additional read key 612, through the path of steps 722, 730 and 736 shown in FIG. 14, at step 738, read stop key 610 is displayed in place of additional read key 612. Clear-all button 602 is active. Monochrome copy start button 604 and color copy start button 606 are also active. As a result, the overall display of task trigger area 484 is as shown at the center of FIG. 7.

Monochrome Printing

When a series of document reading operations ends, the display of task trigger area 484 is as shown on the right side of FIG. 7 (step 716 of FIG. 13). Assume that the user presses monochrome copy start button 604 in this state. Then, through steps 722 and 724 of FIG. 14, at step 732, additional read key 612 is inactivated. Clear-all button 602 becomes active. In place of monochrome copy start button 604 and color copy start button 606, copy stop button 630 shown at the center of FIG. 9 is displayed. Monochrome copy start button 604 and color copy start button 606 are not displayed on the screen image. Thereafter, a process for monochrome output of the document image or images read by that time takes place at step 734. Further, at step 728, read start button 600 is displayed, clear-all button 602 is inactivated, and monochrome copy start button 604 and color copy start button 606 are activated. As a result, the display of task trigger area 484 returns to the state shown on the left side of FIG. 7.

Here, the display color (color 560 shown in FIG. 6) of copy stop button 630 (see FIG. 9) is complementary to the display color (color 540 shown in FIG. 6) of monochrome copy start button 604. Therefore, it is possible for the user to easily understand that the function of copy stop button 630 is very much different from the function of monochrome copy start button 604.

Color Printing

Assume that when the series of document reading operations ends and the display of task trigger area 484 is in the state as shown on the right side of FIG. 7 (at step 716 of FIG. 13), the user operates color copy start button 606. Then, the control proceeds from step 722 shown in FIG. 14 to step 724. At step 724, additional read key 612 is inactivated. Clear-all button 602 becomes active. In place of monochrome copy start button 604 and color copy start button 606, copy stop button 630 shown at the center of FIG. 9 is displayed. Here, the display color of copy stop button 630 is color 570, which is complementary to the display color (color 550 shown in FIG. 6) of color copy start button 606. By such an approach, it is possible for the user to easily understand that copy stop button 630 has a function very much different from the function of color copy start button 606. At the next step 726, all document images read by that time are output in color. Finally, the process of step 728 is executed, and task trigger area 484 returns to the state shown on the right side of FIG. 7.

When monochrome copy start button 604 or color copy start button 606 is operated, the display of task trigger area 484 is returned to the state shown on the left side of FIG. 7. Specifically, when clear-all button 602 is operated, monochrome copy start button 604 is operated, or color copy start button 606 is operated, additional read key 612 that has been displayed on task trigger area 484 is erased, and read start button 600 is displayed. On the contrary, if these buttons are not operated, additional read key 612 is not erased. Here, these keys may be regarded as buttons that cancel a state allowing additional reading. Such an approach is effective, since user's confusion experienced if additional read key 612 suddenly disappears can be avoided.

<Copy Process>

The transition of task trigger area 484 during the copy process is as shown in FIG. 9. At the copy initial screen image, task trigger area 484 is in the state shown on the left side of FIG. 9. Here, assume that the user places a document on the tray of document reading unit 102 and presses monochrome copy start button 604. In the flowchart shown in FIG. 15, the determination at step 750 becomes positive. At step 754, read start button 600 is inactivated, and clear-all button 602 is activated. In place of monochrome copy start button 604 and color copy start button 606, copy stop button 630 is displayed. Here, the display color of copy stop button 630 is a color complementary to the display color of monochrome copy start button 604.

Further, the process of steps 756, 758, 760 and 762 is repeated by the number of pages of the document. When the image of last page of the document is read, the determination at step 762 becomes positive, and the control proceeds to step 764. At step 764, read start button 600 is activated. Clear-all button 602 is also activated. In place of read stop key 610 shown at the center of FIG. 9, additional monochrome copy start button 632 and additional color copy start button 634 shown on the right side of FIG. 9 are displayed. As a result, task trigger area 484 is changed to the state shown on the right side of FIG. 9.

Referring to FIG. 9, the display color of additional monochrome copy start button 632 (color 578 of FIG. 6) is analogous to the display color (color 540 of FIG. 6) of monochrome copy start button 604. Similarly, the display color (color 548 of FIG. 6) of additional color copy start button 634 is analogous to the display color (color 550 of FIG. 6) of color copy start button 606. Therefore, it is possible for the user to easily understand that monochrome copy start button 604 and additional monochrome copy start button 632 have similar functions and that color copy start button 606 and additional color copy start button 634 have similar functions, respectively.

[Modification]

In the embodiment above, buttons having similar functions are displayed in analogous colors. The present invention, however, is not limited to such an embodiment. By way of example the buttons may be displayed not in analogous colors but in the same color of different tones. Here, the same color of different tones refers to colors of the same hue and different chroma. Based on the similar idea, buttons having much different functions may be displayed not in complementary colors but in the same color as the complementary color but in different tones, or colors analogous to the complementary color.

Further, in the embodiment described above, the background colors of buttons displayed on task trigger area 484 are changed. The present invention, however, is not limited to such an embodiment. The background of buttons may be displayed in one color, and the colors of characters representing the functions of keys may be changed. In that case also, the characters of keys having similar functions may be displayed in analogous colors or the same color of different tones, and characters of keys having different functions may be displayed in complementary colors or colors analogous to the complementary color or the same complementary color of different tones.

Alternatively, display color of a key having a specific meaning or characters of the key (for example, a key instructing suspension of the process) may be always given in the same hue, regardless of the situation when it is used.

In the embodiment above, software buttons have been described. The present invention, however, is not limited to such an embodiment, and it is clear to those skilled in the art that the present invention is generally applicable to any UI component that can be used as a trigger of a process.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A display operation device, comprising:
   a display-integrated operation panel having a display screen;
   a first UI component display device displaying a first user interface (UI) component image on said display screen;
   a process activating device, responsive to a user operation of said first UI component displayed on said display screen by said first UI component display device, for activating a process associated with the first UI component;
   a second UI component display device, responsive to activation of the process associated with said first UI component by said process activating device, for displaying a second UI component in place of said first UI component on said display screen; and
   a process stopping device, responsive to a user operation of said second UI component displayed on said display screen by said second UI component display device, for stopping execution of said process; wherein
   part of said second UI component is displayed in a color complementary to a display color of a part of said first UI component, or a color analogous to the complementary color, or a color same as but having different tone from the complementary color;
   wherein said first UI component includes a monochrome copy start button for instructing start of a monochrome copy process, and a color copy start button for instructing start of a color copy process;
   display color of said monochrome copy start button and display color of said color copy start button are different from each other;
   in response to a user operation of said monochrome copy start button, part of said second UI component is displayed in a color complementary to a display color of a part of said monochrome copy start button; and
   in response to a user operation of said color copy start button, part of said second UI component is displayed in a color complementary to a display color of a part of said color copy start button.

2. The display operation device according to claim 1, further comprising
   a third UI component display device responsive to end of said process, for displaying a third UI component in place of said second UI component; and
   a process resuming device, responsive to a user operation of said third UI component displayed on said display screen by said third UI component display device, for resuming said process; wherein part of said third UI component is displayed in a color analogous to or the same as but having different tone from display color of said part of said first UI component.

3. The display operation device according to claim 2, wherein said third UI component is displayed at the same position, in the same size and in the same shape as said second UI component.

4. The display operation device according to claim 3, wherein said part of said second UI component and said part of said third UI component match if said second and third UI components were superposed.

5. The display operation device according to claim 4, wherein said part of said second UI component is a background portion of said second UI component.

6. The display operation device according to claim 4, wherein said part of said second UI component is a character portion formed in said second UI component.

7. The display operation device according to claim 1, wherein said second UI component is displayed at the same position, in the same size and in the same shape as said first UI component.

8. The display operation device according to claim 7, wherein said part of said first UI component and said part of said second UI component are portions that match if said first and second UI components were superposed.

9. The display operation device according to claim 8, wherein said part of said first UI component is a background portion of said first UI component.

10. The display operation device according to claim 8, wherein said part of said first UI component is a character portion formed in said first UI component.

11. An image forming apparatus, comprising:
the display operation device according to claim 1;
a document reading device, connected to said display operation device, for reading a document and converting the same to image data, in accordance with an instruction from said display operation device; and
an image forming unit, connected to said display operation device and to said document reading device, for storing image data output from said document reading device and, in response to an output instruction from said display operation device, for forming an image of said image data on a sheet of recording paper.

12. A non-transitory computer readable medium storing a program which causes, when executed by a computer connected to a display-integrated operation panel having a display screen, said computer to operate as
a first UI component display device for displaying an image of a first user interface (UI) component on said display screen,
a process activating device, responsive to a user operation of said first UI component displayed on said display screen by said first UI component display device, for activating a process associated with the first UI component,
a second UI component display device, responsive to activation of the process associated with said first UI component by said process activating device, for displaying a second UI component in place of said first UI component on said display screen, and
a process stopping device, responsive to a user operation of said second UI component displayed on said display screen by said second UI component display device, for stopping execution of said process; wherein
part of said second UI component is displayed in a color complementary to a display color of a part of said first UI component, or a color analogous to the complementary color, or a color same as but having different tone from the complementary color;
wherein said first UI component includes a monochrome copy start button for instructing start of a monochrome copy process, and a color copy start button for instructing start of a color copy process;
display color of said monochrome copy start button and display color of said color copy start button are different from each other;
in response to a user operation of said monochrome copy start button, part of said second UI component is displayed in a color complementary to a display color of a part of said monochrome copy start button; and
in response to a user operation of said color copy start button, part of said second UI component is displayed in a color complementary to a display color of a part of said color copy start button.

13. The display operation device according to claim 1, further comprising:
a third UI component display device responsive to end of said process, for displaying a third UI component in place of said second UI component; and
a process resuming device, responsive to a user operation of said third UI component displayed on said display screen by said third UI component display device, for resuming said process; wherein
in response to a user operation of said monochrome copy start button, part of said third UI component is displayed in a color analogous to or the same as but having a different tone from the display color of said part of said monochrome copy start button; and
in response to a user operation of said color copy start button, part of said third UI component is displayed in a color analogous to or the same as but having a different tone from the display color of said part of said color copy start button.

* * * * *